(12) United States Patent
Sumi et al.

(10) Patent No.: US 7,786,727 B2
(45) Date of Patent: Aug. 31, 2010

(54) MINIATURE ROTARY ENCODER

(75) Inventors: Tomonori Sumi, Tokyo (JP); Kouji Oki, Tokyo (JP)

(73) Assignee: Namiki Seimitsu Houseki Kabushiki Kaisha (JP)

( * ) Notice: Subject to any disclaimer, the term of this patent is extended or adjusted under 35 U.S.C. 154(b) by 0 days.

(21) Appl. No.: 12/520,234

(22) PCT Filed: Dec. 7, 2007

(86) PCT No.: PCT/JP2007/073643

§ 371 (c)(1),
(2), (4) Date: Jun. 19, 2009

(87) PCT Pub. No.: WO2008/075569

PCT Pub. Date: Jun. 26, 2008

(65) Prior Publication Data

US 2010/0102802 A1      Apr. 29, 2010

(30) Foreign Application Priority Data

Dec. 21, 2006   (JP) .............................. 2006-344979

(51) Int. Cl.
*G01B 7/30* (2006.01)
(52) U.S. Cl. .................... 324/207.25; 324/174
(58) Field of Classification Search .................... None
See application file for complete search history.

(56) References Cited

U.S. PATENT DOCUMENTS 5,122,741 A    6/1992  Ohsumi
6,958,600 B1*  10/2005 Affaticati et al. ....... 324/207.25
7,208,943 B2*  4/2007  Godoy et al. ........... 324/207.25
2001/0048301 A1* 12/2001 Schlabach et al. ........ 324/207.2
2005/0022617 A1*  2/2005 Sano ......................... 73/865.9
2009/0309583 A1* 12/2009 Ruetz .................... 324/207.25

FOREIGN PATENT DOCUMENTS

| JP | 3-80323     | 8/1991 |
| JP | 2000-146624 | 5/2000 |
| JP | 2001-027551 | 1/2001 |
| WO | 03016829    | 2/2003 |

OTHER PUBLICATIONS

International Search Report; PCT/JP2007/073643; Jan. 8, 2008.

* cited by examiner

*Primary Examiner*—Jay M Patidar
(74) *Attorney, Agent, or Firm*—Studebaker & Brackett PC; Donald R. Studebaker

(57) ABSTRACT

A small rotary encoder capable of easily fitting a substrate into a proper position without using an adhesive or the like is provided. Slits are formed in an encoder case so that the encoder case is partially plate-spring shaped, a step portion and a claw portion are formed on the inner circumference of the encoder case, convex portions and concave portions that are combined with each other are formed on the inner circumference of the encoder case and a substrate, respectively. When the substrate is inserted into the encoder case, the encoder case is bent by the slits so that the substrate can be inserted into the encoder case. The substrate is inserted between the step portion and the claw portion, so that the substrate can be fitted into the encoder case, and the substrate is prevented from being incorrectly fitted in a circumferential direction, so that a position can be easily determined.

4 Claims, 5 Drawing Sheets

MINIATURE ROTARY ENCODER

TECHNICAL FIELD

The present invention relates to a small rotary encoder for detecting the number of rotations and a rotational direction of a motor.

BACKGROUND ART

Conventionally, when the number of rotations and a rotational direction of a motor are detected, an encoder that includes sensors for obtaining information about both of an A-phase and a B-phase, has been used. The encoder, shown in FIG. 4, for example, includes a rotatable magnetic disk 15 and fixed side magnetic sensors 16, and obtains a rectangular wave signal from changes in output voltages of the magnetic sensors 16 according to a rotation of the magnetic disk 15 by passing the output voltages through a comparator.

Further, as shown in FIG. 5, a magnetic micro encoder 17, which is a small rotary encoder, includes a magnetic disc 19, two magnetic sensors 22a and 22b, and a housing 24. The magnetic disc 19 is axially magnetized and is mounted on a rotation shaft 18 together with a first back yoke 20. The two magnetic sensors 22a and 22b are arranged opposite to a surface of the magnetic disc 19 with a gap in an axial direction of the magnetic disc 19, and are mounted on a sensor mounting portion 21b of a flexible print substrate 21 in such a manner that longitudinal directions of the two magnetic sensors 22a and 22b are approximately parallel to a band-shaped wiring portion 21a of the flexible print substrate 21. Also, a second back yoke 23, which forms a magnetic circuit together with the first back yoke 20 and the magnetic disc 19, is mounted on the back of the two magnetic sensors 22a and 22b with the flexible print substrate 21 intervened therebetween. The housing 24 accommodates the first back yoke 20, the magnetic disc 19, the two magnetic sensors 22a and 22b, and the second back yoke 23. In this regard, a cut-out portion 24a, which draws out the band-shaped wiring portion 21a of the flexible print substrate 21 there through, is formed on the housing 24 in such a manner that the flexible print substrate 21 fits into the housing 24. These features being illustrated in International Laid-open Publication WO03/016829.

In regard to conventional small rotary encoders, a method of arranging magnetic sensors in a radial direction of a magnetic disk in view of the relationship between a housing space of the small rotary encoder, is considered in the arrangement of electronic components, such as the magnetic sensors or the like for detecting both of an A-phase and a B-phase. However, it is difficult to arrange the magnetic disk and the magnetic sensors in a housing space having a micro-sized diameter in that there is a limitation in terms of reducing a diameter of the magnetic disk or an arrangement space for the magnetic sensors is required to be in a radial direction of the magnetic disk.

Also, with regard to the magnetic disc, although the diameter of the housing can be reduced by fixedly arranging the magnetic sensors as disclosed in Patent Reference 1, it is necessary to insert and fit a substrate into the housing so that the magnetic sensors may be arranged in desired positions with respect to the magnetic disk. In this regard, a method of fitting the housing into the substrate by using an adhesive after loosely inserting the substrate into an inner circumference of the housing and a method of tightly fitting the substrate into the inner circumference of the housing are considered. Actually, in a small rotary encoder having an outer diameter of about 20 mm, a dimensional tolerance of the circumference of the substrate is large, about ±0.1 mm, and when the substrate tightly fits into the housing, the substrate may not fit into the housing due to enlargement of a tightening value. Also, when the substrate loosely fits into the housing, the magnetic sensors and the magnetic disk may not be fixedly arranged in desired positions due to an increase in a clearance. When the substrate loosely fits into the housing, the adhesive or the like is necessarily used to fix the substrate in the housing. In this case, however, since the substrate must be supported in a desired position until the adhesive is hardened, a jig is necessary and an increase in complication of processing cannot be avoided.

Therefore, the present invention provides a small rotary encoder capable of resolving the above problems, and can easily arrange and fix a substrate in a desired position without changing dimensional tolerances of a housing and the substrate, without requiring a jig used to harden the adhesive during an adhesion process.

SUMMARY OF THE INVENTION

According to an aspect of the present invention, there is provided a small rotary encoder comprising a magnetic disk, a substrate on which a sensor, a multiplying IC, or an output cable is mounted, and a cylindrical encoder case accommodating the magnetic disk and the substrate, wherein slits are formed in the encoder case, a claw portion that protrudes in a radial direction of the encoder case and a step portion that determines a position in an axial direction of the substrate, are formed in the inner circumference of the encoder case, and the step portion and the claw portion allow the is substrate to fit into the encoder case.

By forming the slits, when the substrate is inserted into the encoder case, the encoder case is bent and the substrate is inserted between the step portion and the claw portion, and thus, the substrate can be fitted into the encoder case.

According to another aspect of a small rotary encoder of the present invention, convex and concave portions which are combined with each other, are formed in the inner circumference of the encoder case and the substrate, respectively.

By forming the convex and concave portions in the inner circumference of the encoder case and the substrate, respectively, and combining the convex and concave portions with each other, the substrate can easily determine a position.

According to further another aspect of a small rotary encoder of the present invention, the slits are hook shaped and are formed in a plurality of spots on the encoder case.

By forming the hook shaped slits in the plurality of spots on the encoder case, when the substrate is inserted into the encoder case, although the encoder case is bent, it is possible to adequately secure intensity of the substrate.

In a small rotary encoder of the present invention comprising a cylindrical encoder case, a magnetic disk, and a substrate on which a sensor, a multiplying IC, or an output cable is mounted, a claw portion that protrudes in a radial direction of the encoder case and a step portion that determines a position in an axial direction of the substrate, are formed in the inner circumference of the encoder case, and slits are formed in the encoder case in such a manner that the encoder case is plate-spring shaped, so that the plate-spring part of the encoder case is bent, thereby inserting the substrate into the encoder case without damaging the claw portion and the substrate, and the substrate is inserted between the step portion and the claw portion, thereby fitting the substrate into is the encoder case.

Further, by forming convex and concave portions, which are combined with each other, in the inner circumference of the encoder case and the substrate, respectively, the substrate is prevented from being incorrectly fitted in a circumferential direction, thereby easily determining a position of the substrate.

Hereinafter, a small rotary encoder 1 according to an embodiment of the present invention will now be described with reference to the accompanying drawings.

Figure 1:
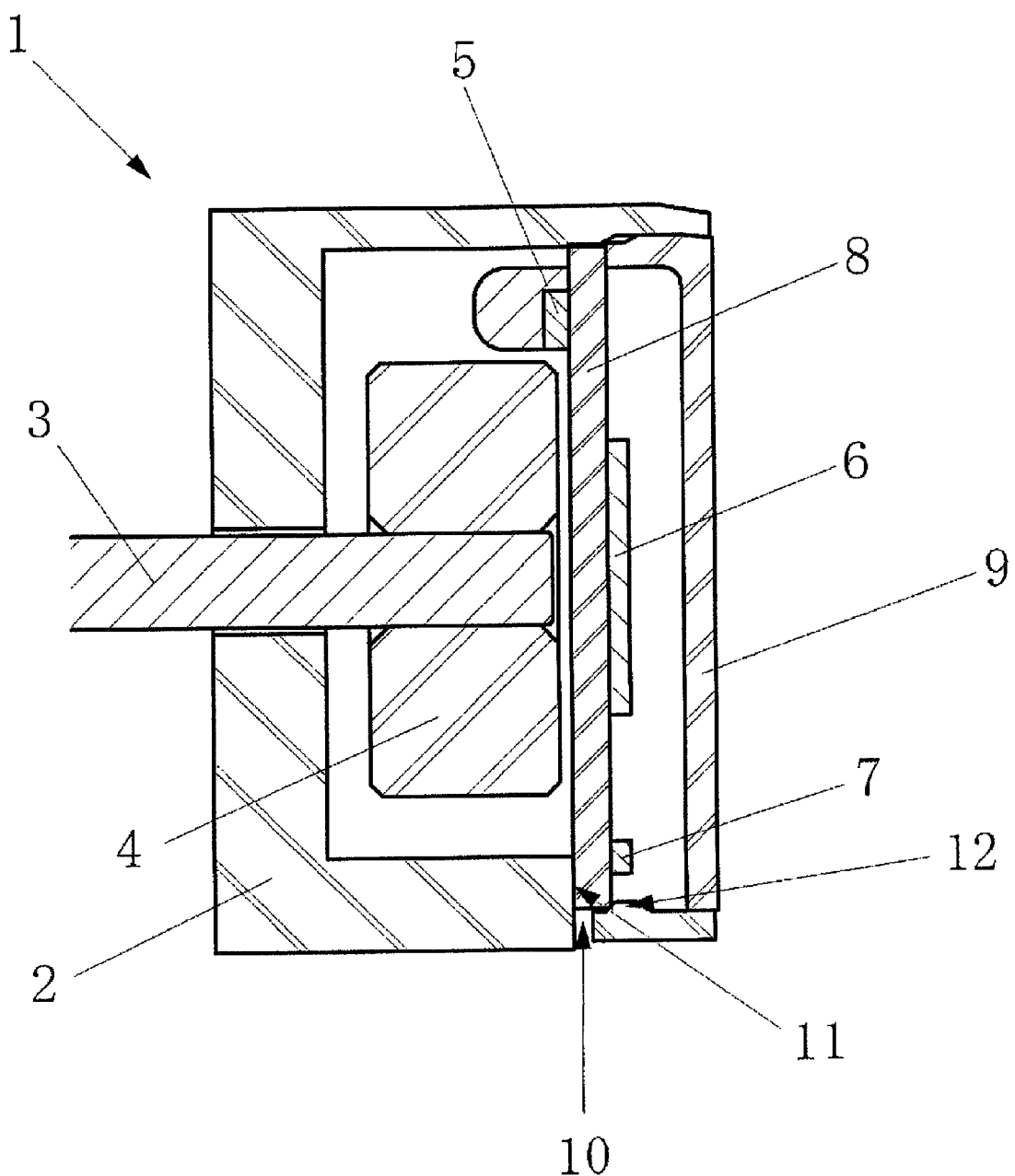
FIG. 1 is a cross-sectional view of a small rotary encoder according to the present invention.

FIG. 1 is a cross-sectional view of the small rotary encoder 1 according to an embodiment of the present invention. Referring to FIG. 1, the small rotary encoder 1 according to the present embodiment includes a cylindrical shaped encoder case 2, a magnetic disk 4 mounted on an end of a rotational shaft 3, a substrate 8 on which a sensor 5, a multiplying integrated circuit (IC) 6, or terminals 7 that are connected to an output cable (not shown) are arranged, and a cap 9.

Figure 2:
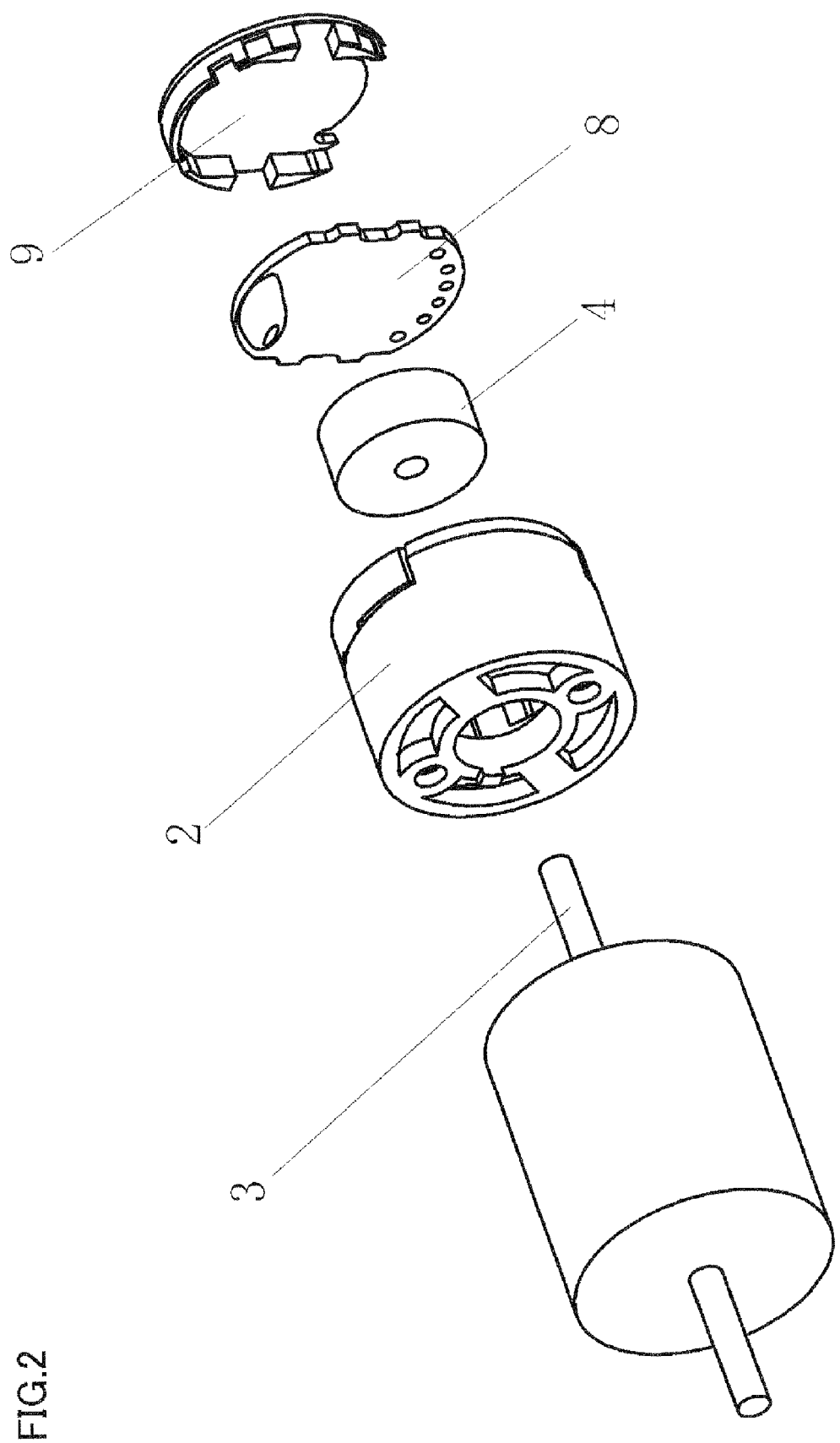
FIG. 2 is an exploded perspective view of the small rotary encoder according to the present invention.

Next, FIG. 2 is an exploded perspective view of the small rotary encoder 1 viewed from a motor. Referring to FIG. 2, the encoder case 2 is fixed to the motor, the magnetic disk 4 is fixed to one end of the rotational shaft 3, and then the substrate 8 and the cap 9 are sequentially fitted into the encoder case 2.

Figure 3:
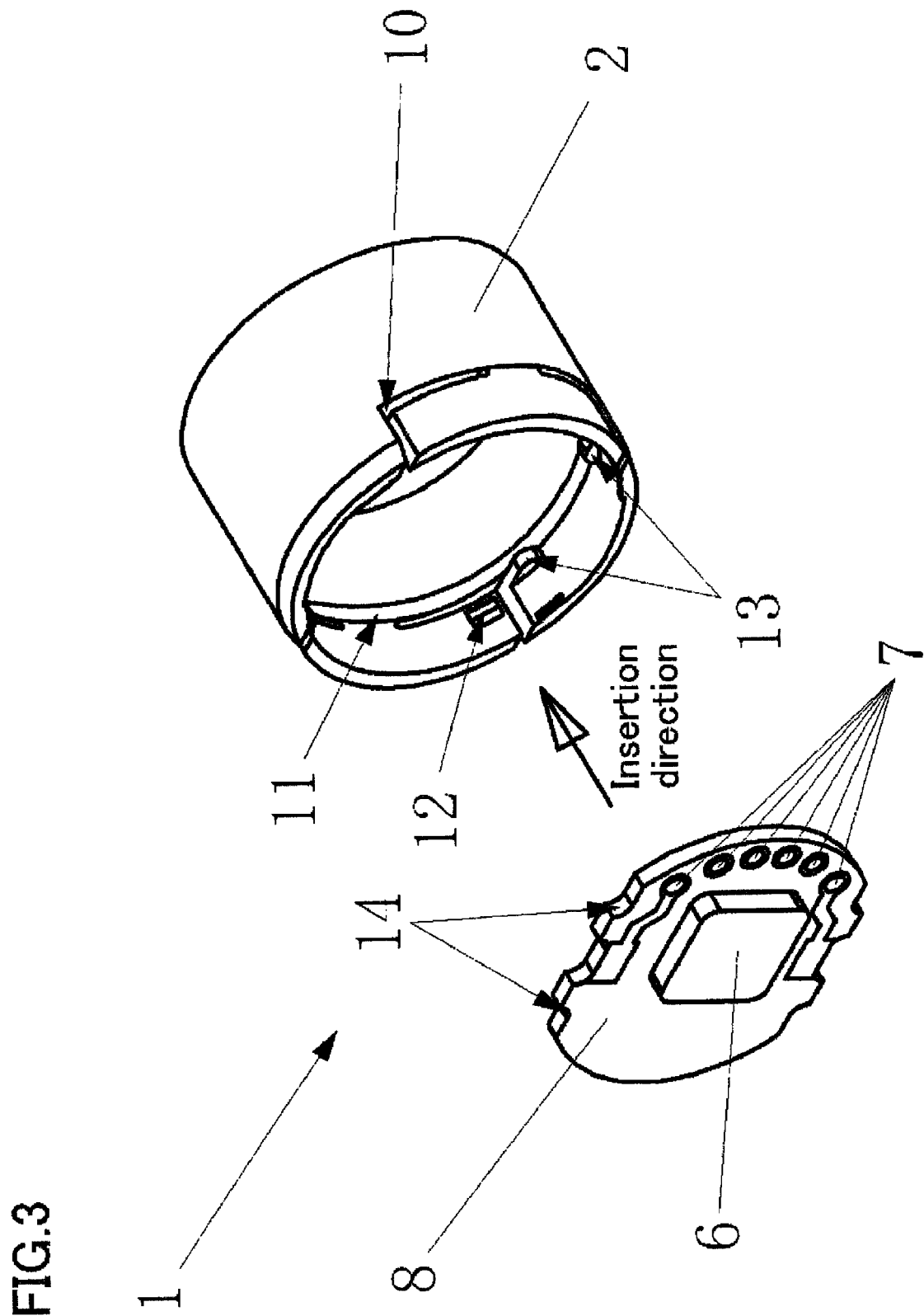
FIG. 3 is a perspective view of an encoder case and a substrate according to the present invention.
Figure 4:
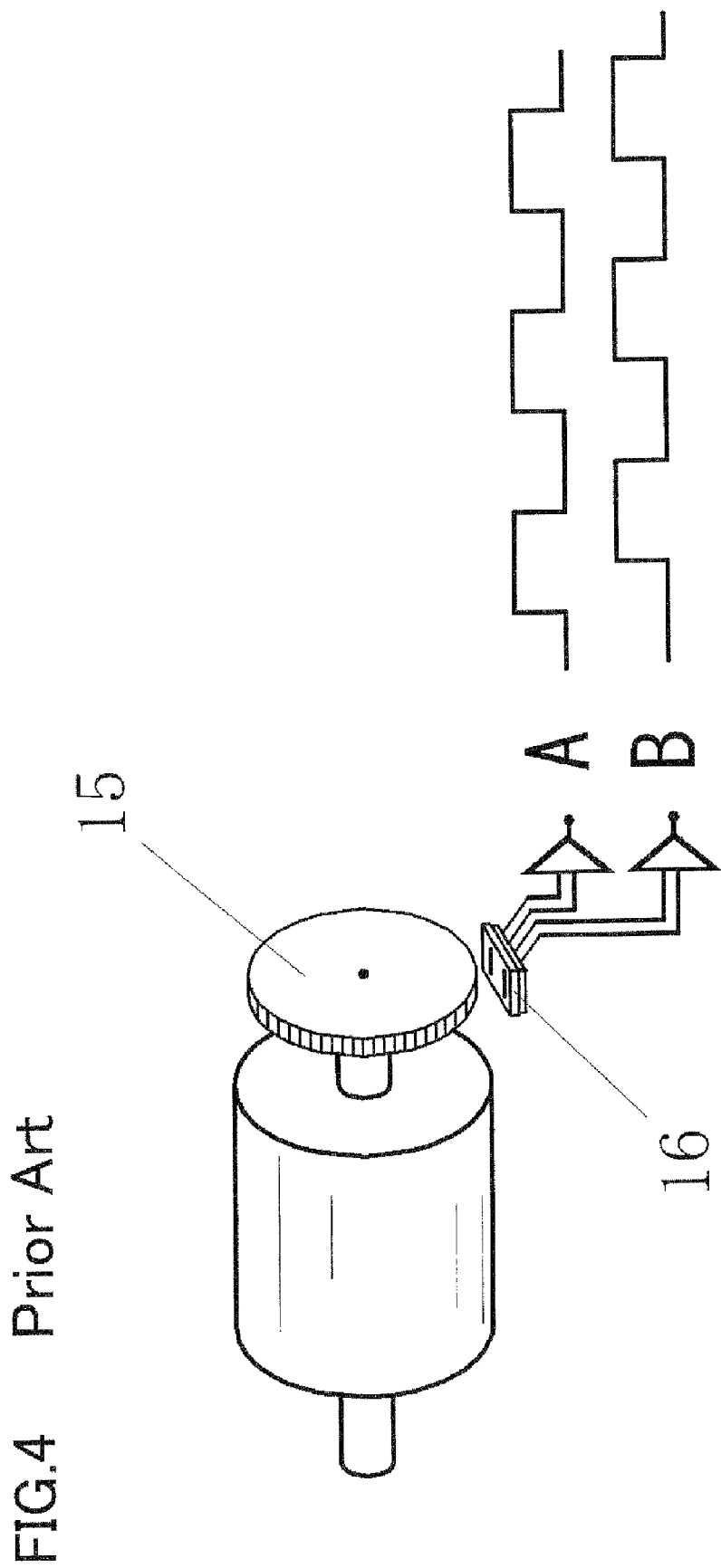
FIG. 4 is a schematic view of a conventional encoder.
Figure 5:
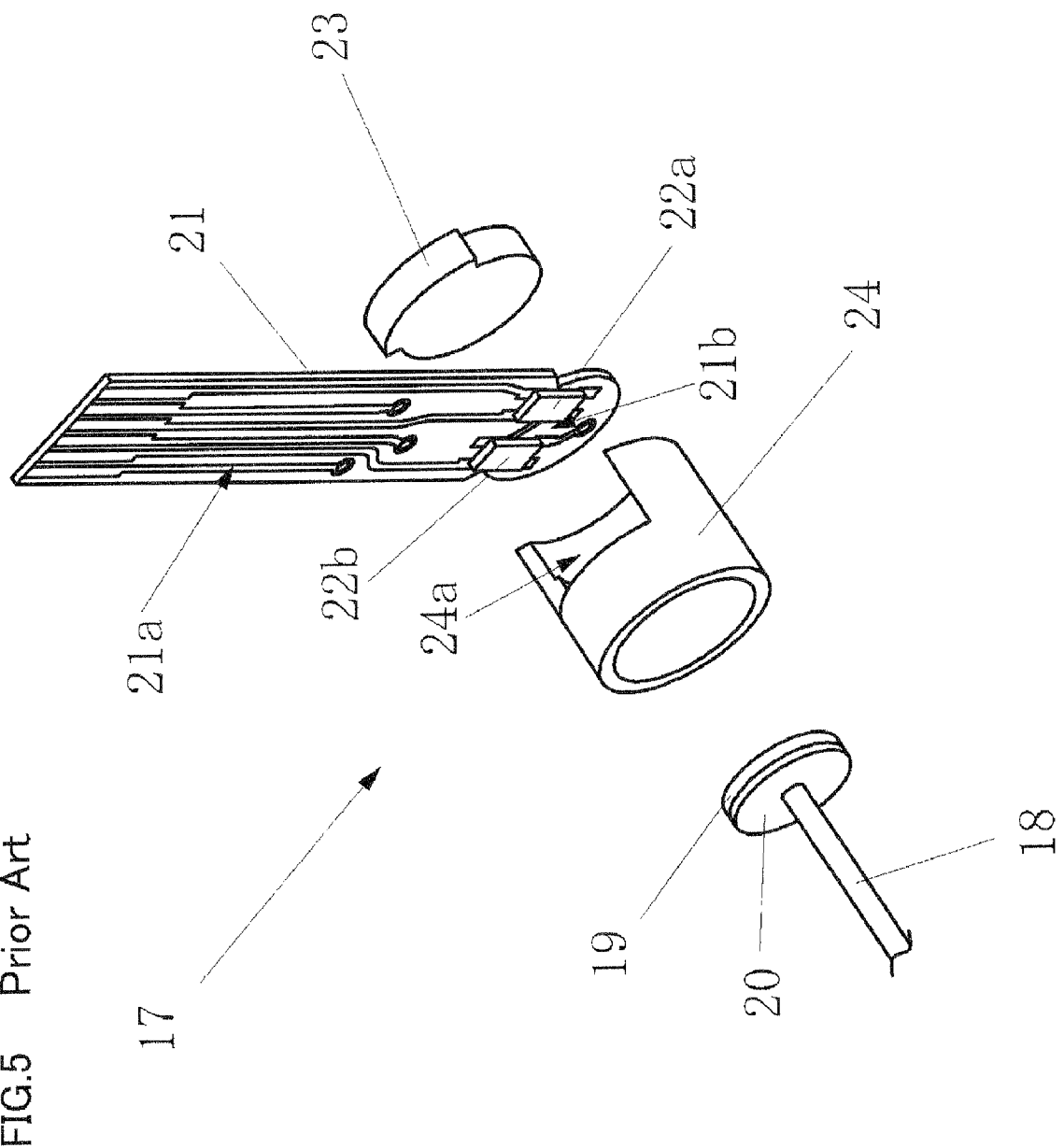
FIG. 5 is an exploded perspective view of a conventional magnetic micro-encoder.

FIG. 3 is a perspective view of the encoder case 2 and the substrate 8 in case of being viewed from the substrate 8. Referring to FIG. 3, if hook shaped slits 10 are bilaterally symmetrical in four spots on the outer circumference of the encoder case 2, the encoder case 2 is partially plate-spring shaped. Also, a claw portion 12 that protrudes in a radial direction of the encoder case 2 and a step portion 11 that determines a position, in an axial direction, of the substrate 8, are formed in the inner circumference of the encoder case 2. In this regard, the claw portion 12 is disposed in a spot where the encoder case 2 is bent by the slits 10 (a part of the encoder case 2 that is plate-spring shaped due to the slits 10).

Therefore, the substrate 8 is stopped from moving in an insertion direction by the step portion 11, and is inserted between the step portion 11 and the claw portion 12 by applying a uniform force, so that the substrate 8 can be easily fixed at a desired position in the encoder case 2 without using an adhesive or a jig.

Also, convex portions 13 are formed on the inner circumference of the encoder case 2 in a radial direction of the encoder case 2. In this regard, concave portions 14 are formed on the substrate 8 so that the concave portions 14 may be combined with the convex portions 13. Therefore, the substrate 8 is prevented from being incorrectly fitted in a circumferential direction and can be easily fixed in a proper position in the encoder case 2.

As described above, hook shaped slits are formed in a plurality of spots on an encoder case of the present invention, and a step portion, a claw portion, and convex and concave portions are formed on the inner circumference of the encoder case, thereby fixing a substrate in the encoder case without using an adhesive or the like, and easily determining a position where the substrate is disposed.

It is therefore apparent that there has been provided, in accordance with the present invention, a surface mount type vibration motor. While this invention has been described in conjunction with a preferred embodiment, it is evident that many alternatives, modifications, and variations would be or are apparent to those of ordinary skill in the application arts. Accordingly, the disclosure is intended to embrace all such alternatives, modifications, equivalents any variations that are within the spirit and scope of this invention.

The invention claimed is:

1. A small rotary encoder comprising a magnetic disk, a substrate where a sensor, a multiplying IC, or an output cable is mounted, and a cylindrical encoder case accommodating the magnetic disk and the substrate,
   wherein slits are formed in the encoder case, a claw portion that protrudes in a radial direction of the encoder case and a step portion that determines a position in an axial direction of the substrate, are formed in the inner circumference of the encoder case, and the step portion and the claw portion allow the substrate to fit into the encoder case.

2. The small rotary encoder of claim 1, wherein convex and concave portions which are combined with each other, are formed on the inner circumference of the encoder case and the substrate, respectively.

3. The small rotary encoder of claim 2, wherein the slits are hook shaped and are formed in a plurality of spots on the encoder case.

4. The small rotary encoder of claim 1, wherein the slits are hook shaped and are formed in a plurality of spots on the encoder case.

* * * * *